United States Patent [19]

Takada

[11] 4,222,610

[45] Sep. 16, 1980

[54] SEAT BELT ANCHORING DEVICE

[76] Inventor: Juichiro Takada, 3-12-1, Shinmachi, Setagayaku, Tokyo, Japan

[21] Appl. No.: 961,870

[22] Filed: Nov. 17, 1978

[30] Foreign Application Priority Data

Nov. 29, 1977 [JP] Japan ................... 52/159196

[51] Int. Cl.² .............. A62B 35/00; A47C 31/00
[52] U.S. Cl. ...................... 297/483; 24/222; 297/468; 297/469
[58] Field of Search ........... 297/385, 389, 388, 386, 297/387, 483, 469; 244/122 B; 24/163 R, 222; 280/744

[56] References Cited

U.S. PATENT DOCUMENTS

| 3,258,293 | 6/1966 | Sharp | 297/385 X |
| 3,598,443 | 8/1971 | Stoffel | 297/389 |
| 3,877,114 | 4/1975 | Silen | 280/744 |
| 4,005,904 | 2/1977 | Neman | 297/388 |
| 4,118,068 | 10/1978 | Fohl | 297/385 |

FOREIGN PATENT DOCUMENTS 2444342 4/1975 Fed. Rep. of Germany ........... 297/385

Primary Examiner—James T. McCall
Attorney, Agent, or Firm—Brumbaugh, Graves, Donohue & Raymond

[57] ABSTRACT

A belt-anchoring device for securing an end of a vehicle passenger-restraining shoulder belt to a part of a vehicle located generally above, behind, and to one side of a vehicle passenger comprises a buckle adapted to be coupled to the aforementioned end of the shoulder belt and an anchor assembly having a mounting portion adapted to be rigidly fastened to the aforementioned part of the vehicle and a buckle-linking portion connected to the mounting portion for articulation about an axis located in a generally vertical plane and oriented generally transversely to the axis of the belt when the belt is in the passenger restraining position. The buckle is attached to the buckle-linking portion of the anchor assembly for pivotal movement about an axis oriented generally transversely of the vehicle.

1 Claim, 4 Drawing Figures

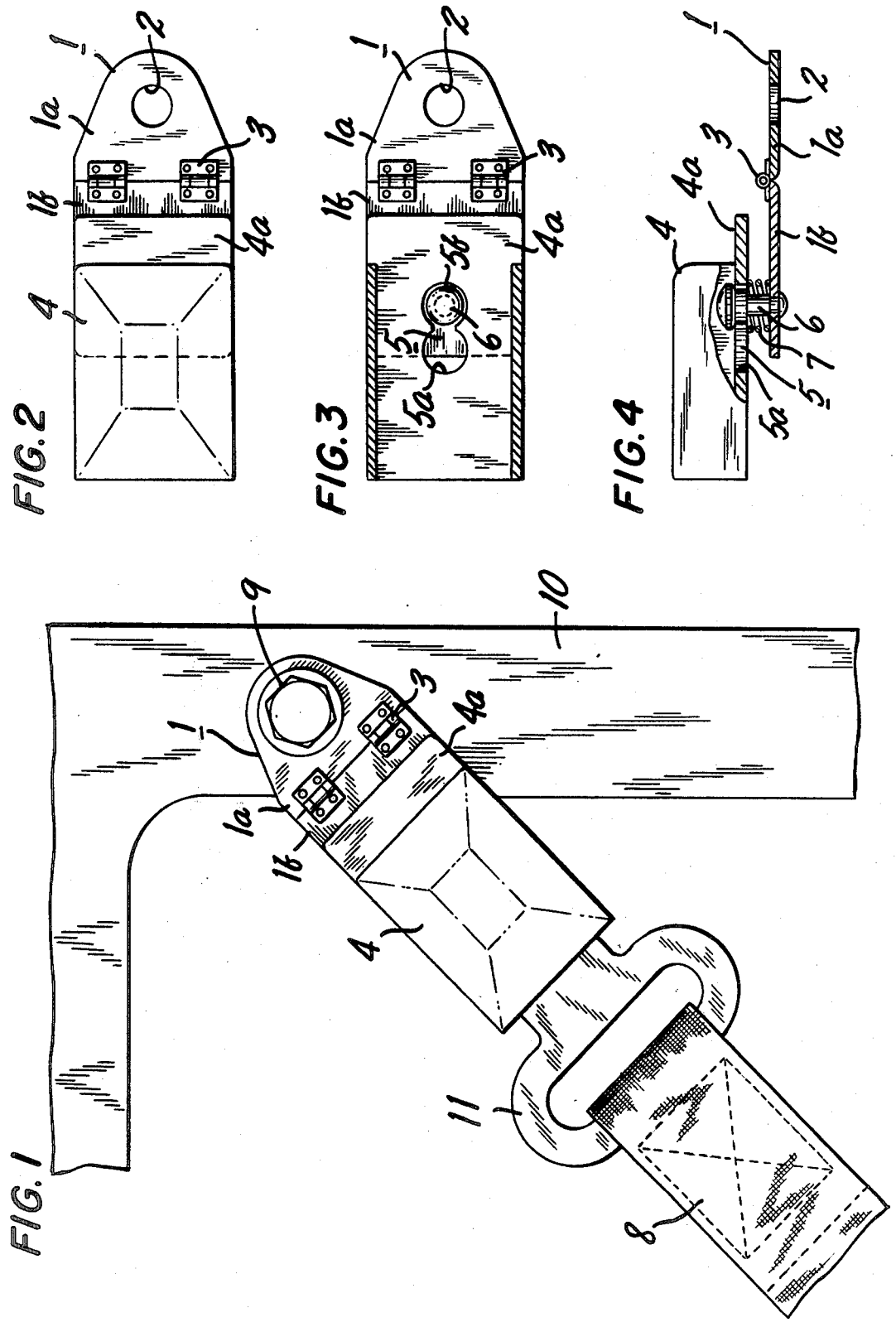

SEAT BELT ANCHORING DEVICE

FIELD OF THE INVENTION

This invention relates to a seat belt anchoring device which provides a better fitting of the shoulder belt to the shape of the body of a passenger.

BACKGROUND OF THE INVENTION

There are a number of passenger restraint belt systems in which the upper end of a shoulder belt is attached to the upper rear corner of the vehicle door or to some other portion of the vehicle generally above, to one side of and behind the passenger. In passive belt systems provision is made for moving the belt from a passenger-restraining to a passenger-releasing position in response to the opening-closing motions of the door, so that the belt will not obstruct the passenger from getting into or out of the vehicle.

Usually, the anchor for the upper end of the shoulder belt of a passive belt system is rigidly secured so that the belt leads away in a given direction only and does not fit well to passengers other than those of a certain height and weight. Therefore, there has been proposed a belt support device which permits the position of the anchor member to be adjusted in accordance with the physique of the passenger. With such a device, however, the position of the anchor member must be changed each time to suit the physique of the passenger. Moreover, with such devices adjustment is afforded only vertically with reference to the height of the passenger; adjustment of the angle at which the belt leads from the anchor is not provided for.

SUMMARY OF THE INVENTION

This invention provides a belt-anchoring device which enables the shoulder belt to turn or adjust so as to fit better to passengers of various physiques.

More particularly, a belt-anchoring device, according to the present invention, comprises a buckle adapted to be coupled to the upper end of a shoulder belt and an anchor assembly which includes a mounting portion adapted to be rigidly fastened to a part of the vehicle located generally above, behind and to one side of a vehicle passenger and a buckle-linking portion which is joined to the mounting portion for articulation about an axis located in a generally vertical plane and oriented generally transversely to the axis of the belt when the belt is in the passenger restraining position. The buckle is connected to the buckle-linking portion of the anchor assembly for pivotal movement about an axis oriented generally transversely of the vehicle.

The invention enables the belt to adjust automatically to fit passengers of different physiques by affording movements of the attachment point of the upper end of the belt laterally, vertically and longitudinally. Articulation of the buckle-linking portion provides the lateral movement, as well as some vertical and longitudinal movement. Pivoting of the buckle on the buckle-linking portion affords longitudinal and vertical adjustment of the belt attachment point.

For a better understanding of the invention reference may be made to the following description of an exemplary embodiment taken in conjunction with the accompanying drawings.

DESCRIPTION OF THE DRAWINGS

FIG. 1 is a top view of the embodiment and shows it installed in the vehicle;

FIG. 2 is a top view of the embodiment;

FIG. 3 is a top cross-sectional view of the embodiment; and

FIG. 4 is a side cross-sectional view of the embodiment.

DESCRIPTION OF EXEMPLARY EMBODIMENT

In the drawings, reference numeral 1 represents the anchor assembly, 2 a bolt mounting hole, 3 a hinge attached between a mounting portion 1a of the anchor assembly 1 and a buckle-linking portion 1b, 4 a buckle, 4a a bottom plate of the buckle 4, and 5 a fastening hole for rotatably attaching the buckle 4 to the buckle-linking portion 1b of the anchor assembly 1. The fastening hole 5 in the bottom plate 4a consists of a larger portion 5a and a smaller portion 5b that are connected together. A fastening pin 6 on the buckle-linking portion 1b is inserted into the larger portion 5a and then moved into the smaller portion 5b to attain a fastened position, as shown in FIGS. 3 and 4. Therefore, the larger portion 5a of the hole 5 has a diameter which permits the head portion of the pin 6 to freely pass therethrough, while the smaller portion 5b has a diameter which permits the stem of the pin 6 to be received but does not permit the head portion to pass therethrough. A spring 7 surrounds the pin and is compressed between the belt-linking portion 1b and the plate 4a to stabilize the attachment of the buckle to the anchor assembly.

As shown in FIG. 1, the mounting portion 1a of the anchor assembly 1 is fastened rigidly to the vehicle door frame 10 near the upper, rear corner by a mounting bolt 9. The buckle 4 of the anchoring device receives a tongue 11 on the upper end of the shoulder belt 8 of a passive belt system.

While in the embodiment shown in the drawings, the mounting portion 1a of the anchor assembly 1 is connected to the buckle-linking portion 1b by means of a hinge 3 so as to be foldable, the portions 1a and 1b may have knuckles on their adjoining ends which receive a pin and form a hinge. Moreover, instead of the fastening hole 5 being on the bottom plate of the buckle and the pin being on the buckle-linking portion 1b, those parts can be reversed—i.e., the pin can be secured on the bottom plate 4a of the buckle at the place corresponding to the hole 5b and extend from the underside of the bottom plate 4a of the buckle, and two interconnected holes like the above-described holes 5a, 5b can be formed in the buckle-linking portion 1b of the anchor assembly. In other words, the holes 5a, 5b can be on the buckle-linking portion 1b of the anchor assembly 1, and the pin can be on the buckle so that the relative pivotal motion between buckle 4 and anchor assembly 1 is afforded as in the embodiment shown in the drawings.

The anchoring device affords lateral (inward and outward) movement of the buckle by folding of the anchor assembly owing to the function of the hinge 3 and also permits the buckle to pivot. Accordingly, the belt is always suitably fitted to the physique of the passenger.

The anchoring device of this invention, when used with a passive belt system, allows the belt to adjust itself to the passenger-releasing position by folding and pivoting. When the system transfers to the passenger-restraining position, the device of this invention allows the belt to return automatically under the pull exerted by the shoulder belt to a configuration in which it will fit well to the physique of the passenger.

The location for mounting the anchor assembly 1 of this invention is not limited to the door frame; the anchoring device may be mounted on any strong member, such as a center pillar of the device, on the side of the seat, or on the roof.

Thus the invention provides, in a simple and effective way, a restraint belt anchor device that adjusts to the physique of the passenger, thus freeing the passenger from the discomfort that is often encountered with the conventional seat belt. Moreover, there is no need of changing the mounting position of the anchor member, depending upon the physique of the passenger. Various parts required by the conventional adjusting devices are obviated, and the construction simplified. In this way, the device of this invention is especially practicable and effective for use in a passive belt system.

I claim:

1. A belt-anchoring device for securing an end of a passive vehicle passenger-restraining shoulder belt to a part of a vehicle located generally above, behind, and outboard of a vehicle passenger comprising a buckle adapted to be coupled to the aforementioned end of the shoulder belt; an anchor assembly having a mounting portion adapted to be rigidly fastened to the aforementioned part of the vehicle, a buckle-linking portion, and hinge means connecting the buckle-linking portion to the mounting portion for articulation about an axis located in a generally vertical plane and oriented generally transversely to the axis of the belt when the belt is in the passenger restraining position; and means connecting the buckle to the buckle-linking portion of the anchor assembly for pivotal movement about an axis oriented generally transversely of the vehicle.

* * * * *